(12) United States Patent
Lee et al.

(10) Patent No.: US 11,655,398 B2
(45) Date of Patent: May 23, 2023

(54) CURABLE PETROLEUM RESIN, PREPARATION METHOD THEREFOR, AND USE THEREOF

(71) Applicant: KOLON INDUSTRIES, INC., Seoul (KR)

(72) Inventors: Je Min Lee, Yongin-si (KR); Jae Kyung Hwang, Yongin-si (KR); Wan Jae Lee, Yongin-si (KR); Myung Jong Kim, Yongin-si (KR); Won Seok Gong, Yongin-si (KR); Jun Hyo Park, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 36 days.

(21) Appl. No.: 16/314,351

(22) PCT Filed: Jun. 30, 2017

(86) PCT No.: PCT/KR2017/006933
§ 371 (c)(1),
(2) Date: Dec. 28, 2018

(87) PCT Pub. No.: WO2018/004287
PCT Pub. Date: Jan. 4, 2018

(65) Prior Publication Data
US 2019/0203083 A1 Jul. 4, 2019

(30) Foreign Application Priority Data

Jun. 30, 2016 (KR) .................. 10-2016-0082297
Jun. 29, 2017 (KR) .................. 10-2017-0082798

(51) Int. Cl.
| | | |
|---|---|---|
| C08F 36/04 | (2006.01) | |
| C09J 11/08 | (2006.01) | |
| C09J 123/02 | (2006.01) | |
| C08G 77/442 | (2006.01) | |
| C08F 240/00 | (2006.01) | |
| C08F 222/04 | (2006.01) | |
| C08G 77/42 | (2006.01) | |
| C09J 191/00 | (2006.01) | |
| C09J 145/00 | (2006.01) | |
| C08F 289/00 | (2006.01) | |

(52) U.S. Cl.
CPC ............ C09J 11/08 (2013.01); C08F 36/045 (2013.01); C08F 222/04 (2013.01); C08F 240/00 (2013.01); C08F 289/00 (2013.01); C08G 77/42 (2013.01); C08G 77/442 (2013.01); C09J 123/02 (2013.01); C09J 145/00 (2013.01); C09J 191/00 (2013.01)

(58) Field of Classification Search
CPC ...... C08G 77/42; C08G 77/442; C08G 69/08; C09J 123/02; C09J 11/08; C09J 145/00; C09J 4/06; C09J 151/06; C09J 123/147; C09J 191/00; C08F 240/00; C08F 232/08; C08F 222/04; C08F 289/00; C08F 36/045; C08F 255/02; C08F 285/00; C08F 230/085; C08F 222/06; C08L 45/00; C08L 23/147; C08J 9/16; C08J 9/232; C08J 9/18; B29C 44/00; G01N 25/20; C01P 2004/64; C08K 5/20
See application file for complete search history.

(56) References Cited

U.S. PATENT DOCUMENTS

| | | |
|---|---|---|
| 3,005,800 A * | 10/1961 | Powers ..................... C08F 8/44 525/263 |
| 4,126,739 A | 11/1978 | Hoene et al. |
| 5,824,718 A | 10/1998 | Penfold et al. |
| 6,458,902 B1 | 10/2002 | Okazaki et al. |
| 7,465,773 B2 | 12/2008 | Kodemura et al. |
| 8,101,697 B2 | 1/2012 | Pawlow et al. |
| 9,059,152 B2 | 6/2015 | Inoue et al. |
| 10,400,142 B2 | 9/2019 | Ichikawa et al. |
| 2005/0043455 A1 | 2/2005 | Hohner |
| 2012/0288721 A1 | 11/2012 | Cho et al. |
| 2013/0220516 A1 * | 8/2013 | Uhl et al. ............... B29B 9/065 156/110.1 |
| 2017/0213804 A1 | 7/2017 | Lin et al. |
| 2017/0218131 A1 | 8/2017 | Son et al. |

FOREIGN PATENT DOCUMENTS

| | | |
|---|---|---|
| CN | 1277620 A | 12/2000 |
| CN | 1737027 A | 2/2006 |
| CN | 1760303 A | 4/2006 |
| CN | 103347970 A | 10/2013 |
| CN | 104694058 A | 6/2015 |
| EP | 0889107 A2 | 6/1998 |
| EP | 0944670 B1 | 11/2000 |
| JP | 56-110705 A | 9/1981 |
| JP | 60-101125 A | 6/1985 |
| JP | 1985-101125 A | 6/1985 |
| JP | 11-080698 A | 3/1999 |
| JP | 11-335446 A | 12/1999 |

(Continued)

OTHER PUBLICATIONS

Pu et al., "Study on C5 Petroleum Resin Modified by Maleic Anhydride", Journal of Huaiyin Teachers College (JCR Science Edition), pp. 323-326, vol. 6, No. 4.

*Primary Examiner* — Irina S Zemel
(74) *Attorney, Agent, or Firm* — Novick, Kim & Lee PLLC; Jae Youn Kim

(57) ABSTRACT

The present invention relates to a curable petroleum resin, a preparation method therefor, and use thereof, wherein the curable petroleum resin comprises a repeating unit derived from a petroleum resin monomer, a repeating unit derived from a silane monomer and a repeating unit derived from a cyclic anhydride monomer, and wherein the curable petroleum resin is used as an additive for a reactive polyolefin-based adhesive composition to increase the adhesive strength to a polyolefin-based substrate used for various parts.

8 Claims, 3 Drawing Sheets

(56) References Cited

FOREIGN PATENT DOCUMENTS

| | | |
|---|---|---|
| JP | 2011-011265 A | 1/2011 |
| JP | 2017-523288 A | 8/2017 |
| KR | 10-0674593 B1 | 1/2007 |
| KR | 10-1174019 B1 | 9/2011 |
| KR | 10-1305438 B1 | 9/2013 |
| KR | 10-2016-0016677 A | 2/2016 |
| KR | 2016-0016677 A | 2/2016 |
| KR | 10-2016-0082297 A | 7/2016 |
| KR | 10-2017-0082798 A | 7/2017 |
| TW | I499012 B | 9/2015 |
| WO | 98/26001 A1 | 6/1998 |
| WO | 2005/012427 A1 | 2/2005 |
| WO | 2005/100501 A1 | 10/2005 |
| WO | 2012/062586 A1 | 5/2012 |
| WO | 2015-125546 A1 | 8/2015 |
| WO | 2016/018131 A1 | 2/2016 |

\* cited by examiner

CURABLE PETROLEUM RESIN, PREPARATION METHOD THEREFOR, AND USE THEREOF

TECHNICAL FIELD

This application claims the benefit of Korean Patent Application No. 10-2016-0082297, filed on Jun. 30, 2016 with the Korean Intellectual Property Office and Korean Patent Application No. 10-2017-0082798, filed on Jun. 29, 2017 with the Korean Intellectual Property Office, the disclosure of which are herein incorporated by reference in their entirety.

The present invention relates to a curable petroleum resin, a method for preparing the same, and use thereof.

BACKGROUND ART

As materials used for automobiles, non-ferrous metals such as aluminum, rubber, or polymer materials such as plastics are used as well as steel. For weight lightening, components that have been using traditional steel, non-ferrous metals and the like are replaced by plastics, engineering plastics, rubber, thermoplastic elastomers and the like in automotive materials, and among these, polyolefin-based general-purpose plastics such as polypropylene are most widely used.

The polyolefin-based general-purpose plastics have advantages of being light, inexpensive, and having excellent chemical resistance and formability, and are used as large components such as bumpers and instrument panels, or interior materials such as door trims and dash boards in automobiles. Among polyolefin-based resins, polypropylene has received most attention as an automotive interior material.

For assembling plastic materials, various types of adhesives such as solvent based adhesives, water base adhesives, hot-melt adhesives, reactive adhesives or pressure sensitive adhesives are used, and among these, there are growing interests in reactive adhesives.

The reactive adhesive has an advantage in that curing occurs by heat, light or curing agents, the curing reaction is readily controlled, and strong adhesive strength is obtained.

There are various reactive adhesives depending on base polymer types, and among these, reactive polyurethane-based adhesives (polyurethane reactive adhesive, PUR) having a urethane-based resin as a main component are widely used. The reactive polyurethane-based adhesive is coated on a substrate and adheres through a crosslinking reaction (or curing reaction) by reacting with the moisture included in the air, and has an advantage of forming a flexible adhesion film. However, a high-priced isocyanate-based compound is included as a main raw material, and a harmful substance such as tin is included as a catalyst, and market demands for safe and environmental-friendly adhesives for replacing these materials has been increasing.

In response to such demands, reactive polyolefin-based adhesives (polyolefin reactive adhesive, POR) have been proposed.

The reactive polyolefin-based adhesive is low-priced and has excellent adhesive strength, and uses a low density/high density polyethylene resin or a crystalline/non-crystalline polypropylene resin as a main component of a base polymer, and is mixed with a petroleum resin in order to increase adhesive strength with a catalyst for a curing reaction.

As a petroleum resin for enhancing adhesive strength, a C5-based petroleum resin or a C9-based petroleum resin is mostly used as a general petroleum resin or a hydrogenated-formed petroleum resin. As one example, Korean Patent Application No. 10-1174019 discloses an aliphatic petroleum resin as a resin providing gluing properties to an adhesive composition including amorphous polyolefin.

In order to increase a curing rate and improve adhesive strength, a method of using a silane-based compound such as a silane coupling agent has been recently proposed. Korean Patent Application No. 10-1305438 discloses an adhesive including an alkoxysilane compound for adhering polyurethane and an aluminum material used as automotive interior materials.

Such a silane-based compound may be simply added through simple mixing, or used as a form modified to a base polymer, and specifically, US Patent Application Publication No. 2005-0043455, European Patent Application No. EP 0 944 670, International Patent Application Publication No. WO 2005/100501, and U.S. Pat. No. 5,824,718 also disclose compositions introducing various silane-based compounds. However, such a method of simply introducing the silane-based compound has not been able to secure effects of enhancing a curing rate and improving adhesive strength at a target level due to a low grafting rate of the silane-based compound.

Meanwhile, U.S. Pat. No. 8,101,697 discloses a polymer composition including alpha-olefin including a silane functional group and polymerizable olefin such as dicyclopentadiene or norbornene dicarboxylic anhydride usable as an adhesive, and Japanese Patent Application Publication No. 1999-080698 discloses an adhesive composition including strained cycloolefin and silane. However, these patents are not sufficient to be used as a reactive adhesive since an olefin-including cyclic compound is introduced to a side chain through a ring opening metathesis polymerization reaction leading to a branched structure, and reactivity is low.

In addition, the applicant of the present application has proposed a curable petroleum resin in which a silane-based compound is introduced to a petroleum resin instead of a base polymer through Korean Patent Application Publication No. 2016-0016677. Only the possibility was evaluated with descriptions such that the proposed petroleum resin may be used as a reactive adhesive by having a double bond in the molecular structure and being curable. As a result, a certain level of adhesive strength was able to be secured when using a silane-based compound-introduced petroleum resin as an adhesive for a polyolefin-based substrate, however, a higher level of adhesive strength is required.

A polyolefin-based substrate used as an automotive interior material generally goes through pretreatment such as corona treatment, plasma treatment or primer treatment prior to adhesive treatment in order to increase adhesive strength. Such pretreatment results in a longer automobile manufacturing process, and total manufacturing costs increase.

A most common cause of defects in the adhesion area is improper adherent preparation and inappropriate adhesive selection rather than adhesive strength, and therefore, securing an adhesive suitable for polyolefin-based materials used as automotive interior materials is pressing.

A polyolefin-based substrate is a typical nonpolar type, and is generally made to be temporarily polar through pretreatment such as corona in order to increase adhesive strength, however, such a pretreatment process has problems of complicating the process and raising the overall costs.

PRIOR ART DOCUMENTS

Patent Documents

Korean Patent Application No. 10-1305438 (2013 Sep. 2), Adhesive for adhering polyurethane and aluminum
US Patent Application Publication No. 2005-0043455 (2005 Feb. 24), Modified polyolefin waxes
European Patent Application No. EP 0 944 670 (2000 Nov. 22), ABRASION-RESISTANT, SILANE-CROSSLINKABLE POLYMER AND POLYMER BLEND COMPOSITIONS
International Patent Application Publication No. WO 2005/100501 (2005 Oct. 27), Polyolefin adhesive compositions and articles made therefrom
U.S. Pat. No. 5,824,718 (1998 Oct. 20), Silane-crosslinkable, substantially linear ethylene polymers and their uses
U.S. Pat. No. 8,101,697 (2012 Jan. 24), Multi-functionalized high-trans elastomeric polymers
Japanese Patent Application Publication No. 1999-080698 (1999 Mar. 26), Adhesive based on cycloolefin
Korean Patent Application Publication No. 2016-0016677 (2016 Feb. 15), Curable petroleum resin and method for preparing the same

DISCLOSURE

Technical Problem

As a result of extensive studies in view of the above, the inventors of the present invention have identified that, in preparing a petroleum resin used in a reactive polyolefin-based adhesive composition for enhancing adhesive strength with a polyolefin-based substrate without a pretreatment process, excellent adhesive strength for the polyolefin-based substrate may be secured after a curing process when using a copolymer comprising a repeating unit derived from a petroleum resin monomer, a repeating unit derived from a silane monomer and a repeating unit derived from a cyclic anhydride monomer as the petroleum resin.

Accordingly, an aspect of the present invention provides a curable petroleum resin comprising a repeating unit derived from a cyclic anhydride monomer.

Another aspect of the present invention provides a method for preparing the curable petroleum resin.

Still another aspect of the present invention provides a reactive polyolefin-based adhesive composition comprising the curable petroleum resin.

Technical Solution

According to an aspect of the present invention, there is provided a curable petroleum resin comprising a repeating unit derived from a petroleum resin monomer, a repeating unit derived from a silane monomer and a repeating unit derived from a cyclic anhydride monomer.

The cyclic anhydride monomer may comprise one selected from the group consisting of maleic anhydride, itaconic anhydride, citraconic anhydride, propenyl succinic anhydride, 2-pentenedioic anhydride and mixtures thereof.

The petroleum resin monomer may comprise one selected from the group consisting of mixed C5 fractions, mixed C9 fractions, dicyclopentadiene and mixtures thereof obtained from naphtha cracking.

The silane monomer may comprise one selected from the group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-(meth)acryloxypropyltrimethoxysilane and mixtures thereof.

According to another aspect of the present invention, there is provided a method for preparing a curable petroleum resin including preparing by copolymerizing a repeating unit derived from a petroleum resin monomer, a repeating unit derived from a silane monomer and a repeating unit derived from a cyclic anhydride monomer.

According to still another aspect of the present invention, there is provided use of the curable petroleum resin provided above as an adhesive composition.

Advantageous Effects

A curable petroleum resin according to the present invention can be cured by a double bond present in the molecular structure, and can be preferably used as a composition of a reactive adhesive, especially a reactive polyolefin-based adhesive.

Such a reactive polyolefin-based adhesive has a cyclic anhydride repeating unit present in the curable petroleum resin resulting in secondary bonding with a polyolefin-based substrate through polar-nonpolar organic force, and is capable of securing high adhesive strength and attaching strength for a polyolefin-based substrate such as polyethylene or polypropylene among substrates.

Particularly, excellent adhesive strength and attaching strength can be secured for a polyolefin substrate that does not go through a pretreatment process for enhancing adhesive strength such as corona or plasma, and, by excluding the pretreatment process, production costs of various products using polyolefin as a substrate may be significantly reduced, and the process may be more simplified.

The reactive polyolefin-based adhesive can be applied in various fields such as packaging, bookbinding, paper processing fields, construction and civil engineering fields, textile and leather fields, electric and electronic fields or automotive vehicle fields.

BEST MODE

Figure 1:
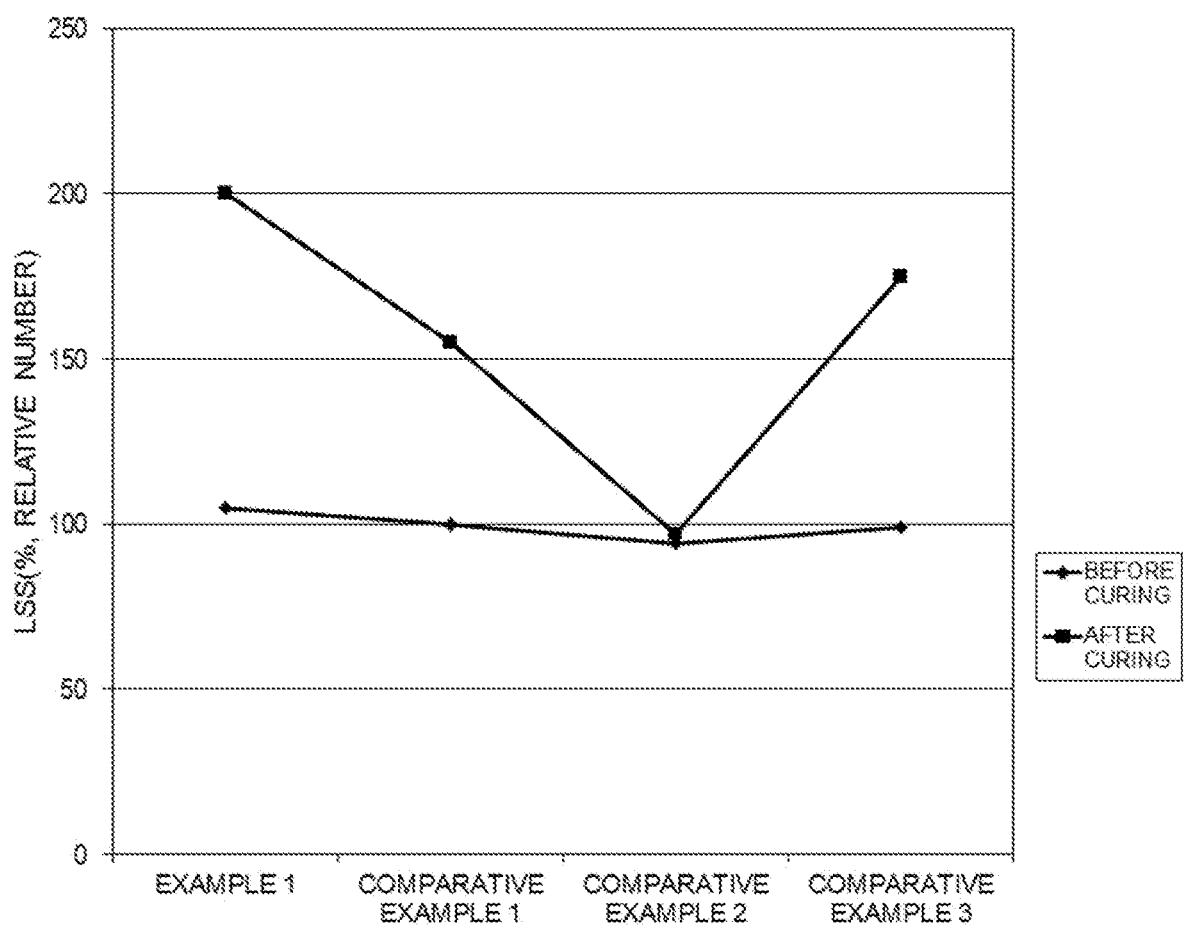
FIG. 1 is a graph showing changes in lap shear strength before and after curing compositions of Example 1 and Comparative Examples 1 and 2 measured in Experimental Example 2.
Figure 2:
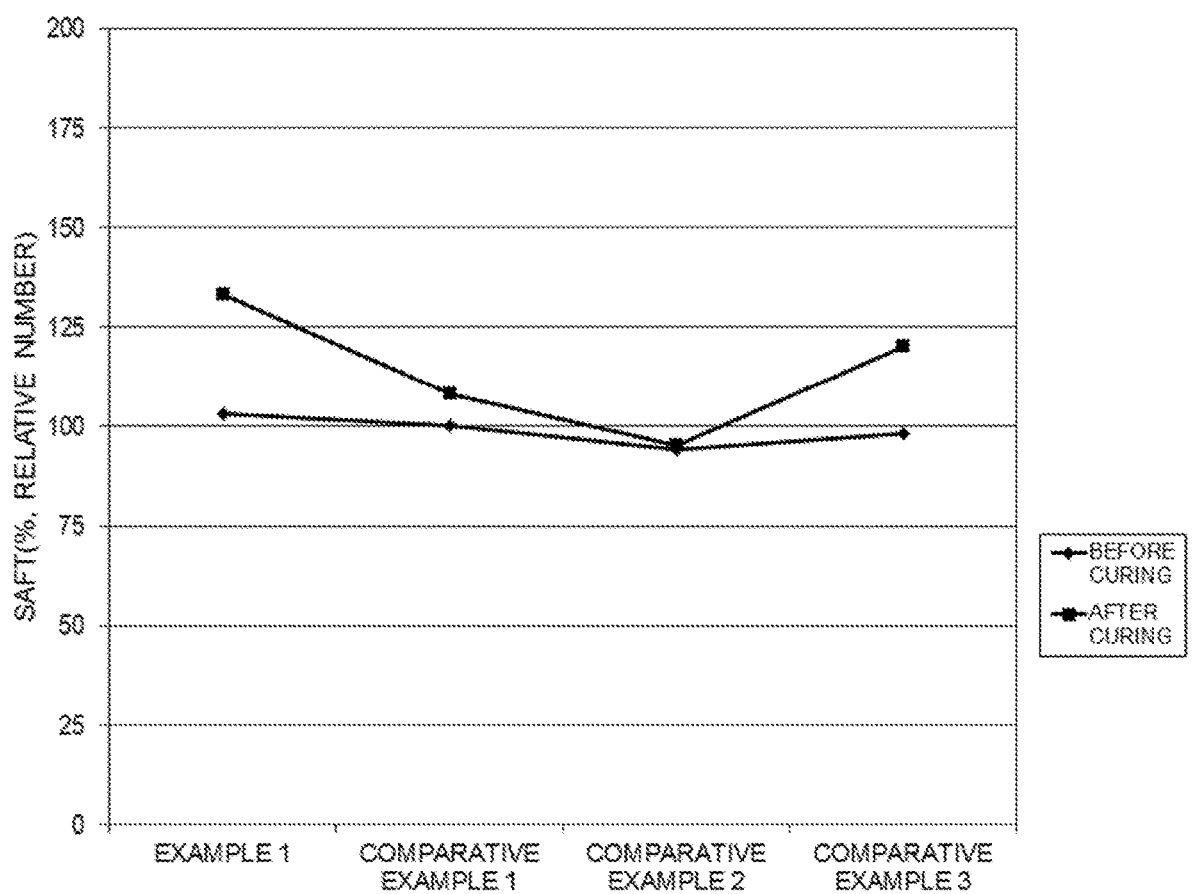
FIG. 2 is a graph showing changes in SAFT before and after curing compositions of Example 1 and Comparative Examples 1 and 2 measured in Experimental Example 2.
Figure 3:
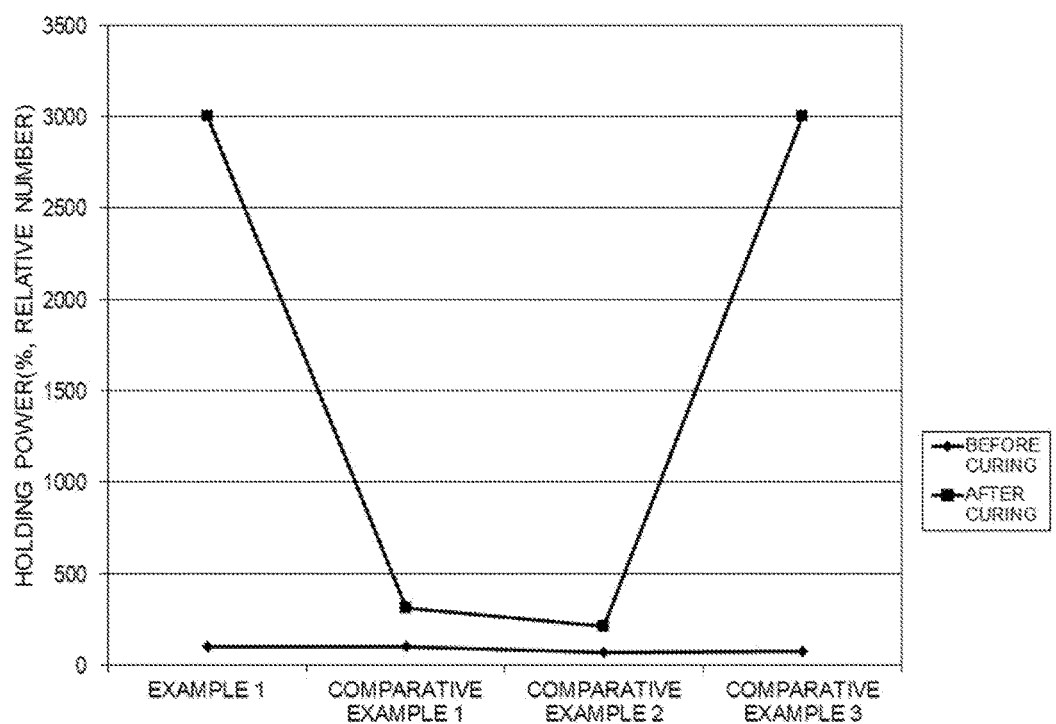
FIG. 3 is a graph showing changes in holding power before and after curing compositions of Example 1 and Comparative Examples 1 and 2 measured in Experimental Example 2.

Hereinafter, the present invention will be described in more detail.

A polyolefin-based substrate is a typical nonpolar type, and is generally made to be temporarily polar through pretreatment such as corona in order to increase adhesive strength, however, the present invention provides an adhesive usable in a nonpolar polyolefin-based substrate as it is without such expensive pretreatment.

Adhesion refers to a state in which two surfaces are attached by the attraction of molecules atoms and ions, and for an adhesive, wetting and adhesive strength are required as a material capable of attaching two materials by interfacial attraction. As wetting for a substrate is more advantageous, a relatively wider initial adhesion area is obtained and higher adhesive strength is obtained, and therefore, the present invention uses a reactive adhesive composition employing a polyolefin-based having a similar chemical structure to a polyolefin-based substrate as a base polymer.

In a reactive polyolefin-based adhesive composition, a petroleum resin is mixed with a polyolefin-based base polymer in order to increase adhesive strength with a catalyst for a curing reaction. Herein, the present invention provides a petroleum resin having a new composition as the petroleum resin so that curing is achieved while having excellent adhesive strength with a polyolefin-based substrate.

Petroleum Resin Specifically, the petroleum resin according to the present invention has a form of a copolymer having three types of monomers copolymerized as represented in the following Chemical Formula 1.

  [Chemical Formula 1]

wherein A is a petroleum resin-derived repeating unit,
B is a silane monomer-derived repeating unit,
C is a cyclic anhydride monomer-derived repeating unit and
m, n and o are an integer of 1 or greater.

Herein, the form of the copolymer is expressed as above for convenience, but is not particularly limited in the present invention, and various forms such as a random copolymer, an alternative copolymer, a block copolymer, a graft copolymer and a starblock copolymer may be included. Preferably, a random copolymer may be included.

Hereinafter, each repeating unit will be described in detail.

A first repeating unit forming the curable petroleum resin according to the present invention is a repeating unit (A) derived from a petroleum resin monomer obtained from naphtha cracking, and includes one or more an ethylenically unsaturated functional group, a polymerizable functional group in the molecular structure.

The petroleum resin monomer may comprise commercializable liquid mixed C5 to C12 fractions or diolefin and may preferably include mixed C5 fractions, mixed C9 fractions or diolefin.

The mixed C5 fraction may include 1-pentene, 2-methyl-2-butene n-pentane, propadiene, dicyclopentadiene, piperylene, isoprene, cyclopentene, 1,3-pentadiene and the like, the mixed C9 fraction may include styrene, vinyl toluene, indene, alpha methylstyrene and benzene/toluene/xylene (BTX) and the like, and the diolefin may include propadiene, dicyclopentadiene, piperylene, isoprene, cyclopentene, 1,3-pentadiene and the like. Preferably diolefin, and more preferably dicyclopentadiene may be included as the petroleum resin monomer.

A second repeating unit forming the curable petroleum resin according to the present invention together with the repeating unit (A) is a repeating unit (B) derived from a silane monomer, and provides a reaction site for crosslinking and curing. The petroleum resin may be cured through the crosslinking and the curing, and when added to a reactive adhesive, adhesive strength may be further enhanced by the curing rather than simply enhancing gluing strength.

The repeating unit (B) is derived from a silane monomer, and is preferably a compound including an ethylenically unsaturated functional group, a polymerizable function group in the molecular structure, represented by the following Chemical Formula 2:

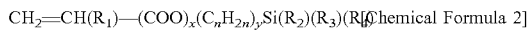  [Chemical Formula 2]

wherein $R_1$ is hydrogen or a methyl group,
$R_2$ to $R_4$ are the same as or different from each other, and hydrogen, a C1 to C20 alkyl group, a C3 to C12 cycloalkyl group, a C1 to C12 alkoxy group, a C2 to C12 acyloxy group, a C6 to C30 aryloxy group, a C5 to C30 araloxy group or a C1 to C20 amine group,
n is an integer of 1 to 12 and
x and y are 0 or 1.

Preferably, $R_1$ is hydrogen or a methyl group, $R_2$ to $R_4$ are the same as or different from each other, and a C1 to C6 alkyl group or a C1 to C6 alkoxy group, n is an integer of 1 to 6 and x and y are 0 or 1.

The "alkyl" mentioned in the present specification means a linear or branched saturated monovalent hydrocarbon site of 1 to 20, preferably 1 to 10 and more preferably 1 to 6 carbon atoms. The alkyl group may be unsubstituted or may be further substituted by certain substituents to describe later. Examples of the alkyl group may include methyl, ethyl, propyl, 2-propyl, n-butyl, iso-butyl, tert-butyl, pentyl, hexyl, dodecyl and the like, and when further substituted with halogen, may include fluoromethyl, difluoromethyl, trifluoromethyl, chloromethyl, dichloromethyl, trichloromethyl, iodomethyl, bromomethyl and the like.

The "cycloalkyl" mentioned in the present specification means a saturated or unsaturated non-aromatic monovalent monocyclic, bicyclic or tricyclic hydrocarbon site of 3 to 12 cyclic carbons.

Examples thereof may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (that is, bicyclo[2,2,1]hept-5-enyl) and the like.

The "alkoxy" mentioned in the present specification means a linear or branched saturated monovalent hydrocarbon site of 1 to 12, preferably 1 to 10 and more preferably 1 to 6 carbon atoms. The alkoxy group may be unsubstituted or may be further substituted by certain substituents to describe later. Examples of the alkoxy group may include methoxy, ethoxy, propoxy, isopropoxy, butoxy, pentoxy, heptoxy, dodexy and the like, and when further substituted with halogen, fluoromethoxy, difluoromethoxy, trifluoromethoxy, chloromethoxy, dichloromethoxy, trichloromethoxy, iodomethoxy, bromomethoxy and the like.

The "acyloxy" mentioned in the present specification is linear or branched hydrocarbon of 1 to 12 and preferably 1 to 10 carbon atoms, and examples thereof may include acetoxy, ethanoloxy, propanoloxy, butanoloxy, pentanoloxy, hexanoloxy, 2,2-dimethylpropanoloxy, 3,3-dimethylbutanoloxy and the like. These may be further substituted with certain substituents.

The "aryloxy" mentioned in the present specification includes cases including oxygen in a monocyclic aryl group or a polycyclic aryl group. Herein, the aryl group means an aromatic ring. Specific examples of the aryloxy group may include phenoxy, p-tolyloxy, m-tolyloxy, 3,5-dimethyl-phenoxy, 2,4,6-trimethylphenoxy, p-tert-butylphenoxy, 3-biphenyloxy, 4-biphenyloxy, 1-naphthyloxy, 2-naphthyloxy, 4-methyl-1-naphthyloxy, 5-methyl-2-naphthyloxy, 1-anthryloxy, 2-anthryloxy, 9-anthryloxy, 1-phenanthryloxy, 3-phenanthryloxy, 9-phenanthryloxy and the like, but are not limited thereto.

The number of carbon atoms of the "amine group" mentioned in the present specification is not particularly limited, but is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group and the like, but are not limited thereto.

In the present specification, all compounds or substituents may be substituted or unsubstituted unless particularly mentioned. Herein, the substituted means hydrogen being replaced by any one selected from the group consisting of a halogen atom, a hydroxyl group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, derivatives thereof and combinations thereof.

Specifically, the silane monomer of Chemical Formula 2 may include one selected from the group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-(meth)acryloxypropyltrimethoxysilane and mixtures thereof, and preferably may include vinyltrimethoxysilane.

When just the silane compound is copolymerized with the petroleum resin monomer, attachability for a polyolefin-based substrate is low, and in the present invention, a cyclic anhydride monomer is used for the copolymerization in order to increase compatibility with the polyolefin-based substrate.

Particularly, a repeating unit (C), a third repeating unit forming the petroleum resin according to the present invention, is a repeating unit derived from a cyclic anhydride monomer, and contributes to increasing adhesive strength with the polyolefin substrate.

Adhesion is adhering force between two materials on a surface where the two materials are in contact, and varies depending on the chemical structure and the like of an adhesive or adherent molecule, and includes primary bonding that is chemical bonding, secondary bonding that is Van der Waals force, and tertiary bonding that is hydrogen bonding. In the adhesion, secondary bonding is generally most important bonding.

Van der Waals force that is secondary bonding refers to attraction or repulsion between molecules or between parts in the molecule, and Van der Waals force (V) is represented as force of the sum of V1+V2+V3.

V1 is adhesion obtained by force by polar groups such as —OH, —COOH or —NH$_2$ in adhesive and adherent molecules, and is also referred to as orientation force (polarity force). In addition, V2 is, when any one of an adhesive and an adherent is polar, attracting each other through polarization as the nonpolar molecule becomes closer to the polar molecule, is defined by force obtained between the nonpolar molecule and the polar molecule, and is referred to as organic force. V3 is, when both an adhesive and an adherent are nonpolar, attracting force acting by temporary generation of a dipole as each of the molecules become closer, and is referred to as dispersion force, force obtained by nonpolar molecules.

Particularly, adhesion is obtained by V2 in the present invention.

The repeating unit (C) forming the petroleum resin in the present invention is a cyclic anhydride monomer-polymerized repeating unit. The cyclic anhydride is a 5-membered or 6-membered cyclic compound and has one double bond in the molecular structure, and, by the double bond being broken when copolymerized with the petroleum resin monomer and the silane monomer, a polymerization reaction occurs by an addition reaction, continuous bonding between neighboring molecules in the same state. As a result, a carboxyl group exhibiting polarity within the petroleum resin is present, and adhesion occurs by the action of organic force with nonpolarity of the polyolefin-based substrate.

The usable cyclic anhydride monomer may comprise, as represented in the following chemical formulae, maleic anhydride, itaconic anhydride, citraconic anhydride, propenyl succinic anhydride, 2-pentenedioic anhydride and the like, and preferably, maleic anhydride may be used.

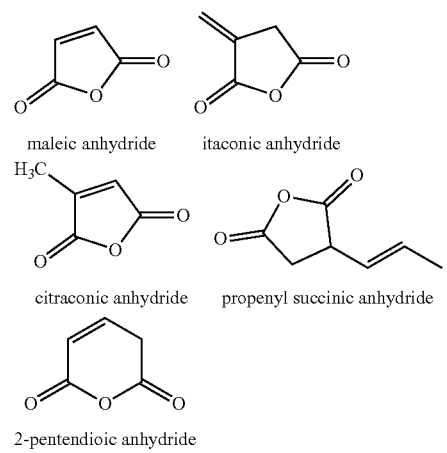

maleic anhydride   itaconic anhydride citraconic anhydride   propenyl succinic anhydride 2-pentendioic anhydride The curable petroleum resin according to the present invention having the repeating units described above is required to limit the content of each of the repeating units in order to provide proper gluing strength for a reactive adhesive composition, to be cured, and to enhance adhesive strength. Such content ranges are ranges to maximize effects to obtain through introducing the silane monomer and the cyclic anhydride monomer, that is, enhancement of curing ability and adhesive strength, while maintaining basic properties of the petroleum resin itself. When the content of the silane-based monomer or the cyclic anhydride monomer increases, the petroleum resin has different softening point and degree of polymerization, and the above-described effects may not be sufficiently secured.

Specifically, based on the total weight of the repeating unit, the repeating unit (A) may be included in amount of from 30% by weight to 70% by weight and preferably from 40% by weight to 60% by weight, the repeating unit (B) may be included in amount of from 10% by weight to 40% by weight and preferably from 15% by weight to 35% by weight and the repeating unit (C) may be included in amount of from 10% by weight to 40% by weight and preferably from 15% by weight to 35% by weight. When the content of the repeating unit (A) is less than the above-mentioned range, a target level of adhesive strength may not be obtained, and when the content is greater than the above-mentioned range on the contrary, the content of the other repeating units is relatively insufficient making it difficult to expect enhancement in the curing ability and the adhesive strength. In addition, when the content of the repeating unit (B) is less than the above-mentioned range, a curing ability declines causing a problem of increasing a curing time, and when the content is greater than the above-mentioned range on the contrary, excessive curing occurs or a curing time is difficult to control. Moreover, when the content of the repeating unit (C) is less than the above-mentioned range, enhancement in the adhesive strength for the polyolefin-based substrate may not be expected, and when the content is greater than the above-mentioned range on the contrary, the content of the other repeating units is relatively insufficient making it difficult to expect enhancement in the curing ability and the adhesive strength.

The petroleum resin according to the present invention may have a softening point of from 70° C. to 150° C., and a weight average molecular weight (Mn) of from 500 g/mol to 800 g/mol.

Method for Preparing Petroleum Resin

Meanwhile, the curable petroleum resin according to the present invention is prepared by copolymerizing the petroleum resin monomer, the silane monomer and the cyclic anhydride monomer described above. Herein, the copolymerization is progressed by an addition reaction between double bonds present in each of the monomers. Particularly, the petroleum resin according to the present invention forms a copolymer-structured resin including the above-described monomers having excellent adhesive strength on the main chain through chain polymerization, and may exhibit excellent adhesion properties when used in a reactive adhesive composition due to excellent reactivity.

Various methods may be used as the copolymerization, and the copolymerization is not particularly limited in the present invention. As one example, methods of thermal polymerization, photopolymerization, ion polymerization and radiation polymerization may be used, and a thermal polymerization method may be preferably used.

The thermal polymerization may be performed by introducing the petroleum resin monomer, the silane monomer and the cyclic anhydride monomer to a reactor, and then reacting the result for 0.5 hours to 10 hours and preferably for 1 hour to 3 hours after applying heat of 150° C. to 300° C., and when necessary, a pressure may be applied. As for applying the pressure, a separate pressure applying apparatus may be installed, or the thermal polymerization may be performed in an autoclave. Herein, the pressure may be in a range of from 20 bar to 25 bar.

Such ranges of reaction temperature, time and pressure during the thermal polymerization are an optimal parameter for obtaining a petroleum resin capable of satisfying copolymer properties (molar ratio, composition) provided above. The ranges of reaction temperature, time and pressure being outside the above-mentioned ranges has problems such that unreacted materials are present in a final product, or a molecular weight of the petroleum resin decreases. In addition, the thermal polymerization being performed under an excessive condition has problems such as a decrease in the adhesive strength due to side reactions, an excessive increase in the molecular weight or the like.

Particularly, the preparation of the petroleum resin may exclude the use of a thermal polymerization initiator during the thermal polymerization due to high reactivity of each of the monomers, and when necessary, a reaction solvent may be used.

As the usable reaction solvent, non-polymerizable solvents may be used. Propane, butane, pentane, hexane, octane, decane, dodecane, cyclopentane, methylcyclopentane, cyclohexane, methylcyclohexane, benzene, toluene, xylene, dichloromethane, chloroethane, dichloroethane, chlorobenzene and the like may be used, and benzene, xylene, toluene, cyclohexane or mixed solvents thereof may be preferably used. Herein, the reaction solvent may be diluted so that the final concentration of the reactant becomes from 30% by weight to 70% by weight.

The petroleum resin obtained after the thermal polymerization may goes through a common post-treatment process such as a degassing and a concentration process to remove unreacted materials, side reaction products and the like, and a curable petroleum resin to prepare in the present invention may be obtained.

The degassing process is a process for separating the solid curable petroleum resin from unreacted materials and side reaction products (for example, oligomers), and may be performed at a high temperature, and when necessary, may be performed under a high pressure.

The degassing process is directly related to a yield and a softening point of the petroleum resin, and as the degassing temperature increases, the yield and the softening point tend to decrease. However, when the degassing temperature is too low, unreacted materials and side reaction products are difficult to remove, and purity of the curable petroleum resin greatly decreases. Accordingly, the degassing process needs to be performed under the condition without decreases in the yield and the softening point.

In the present invention, the degassing process may be performed for from 1 minute to 15 minutes in a temperature range of from 200° C. to 280° C. and preferably 230° C. to 270° C. When the degassing is performed at a temperature lower than the above-mentioned range, purity of the curable petroleum resin decreases as described above, and when performed at a temperature higher than the above-mentioned range on the contrary, the yield and the softening point decrease resulting in decline in the properties (that is, adhesive strength, cohesive strength) of the finally obtained petroleum resin, and therefore, the temperature may be properly maintained in the above-mentioned range.

Reactive Adhesive Composition

The curable petroleum resin described above may be used in various applications, and may be preferably used in a reactive adhesive composition since curing is achieved by a double bond in the molecular structure.

The reactive adhesive composition may include a polyolefin-based base polymer, a petroleum resin and a catalyst, and particularly, high adhesive strength for various substrates may be secured by using the above-described curable petroleum resin as a petroleum resin of the reactive polyolefin-based adhesive composition in the present invention.

Particularly, with high adhesive strength, the reactive polyolefin-based adhesive composition of the present invention may exclude a pretreatment process (for example, plasma treatment, corona treatment, primer treatment or the like) of a base having been performed for securing adhesive strength in the prior art. Herein, the substrate is not particularly limited in the present invention, and various plastics, films, paper, non-woven fabrics, glass or metals may be used. Among the plastics, polyolefin-based resins used as automotive interior materials may be used.

preferably, the reactive polyolefin-based adhesive composition according to the present invention may include, based on the total weight of the composition, the polyolefin-based base polymer in 70% by weight to 94% by weight and preferably in 75% by weight to 90% by weight, the curable petroleum resin in 5% by weight to 30% by weight and preferably in 10% by weight to 25% by weight, and the catalyst in 0.1% by weight to 10% by weight and preferably in 0.5% by weight to 5% by weight.

When the content of the curable petroleum resin is less than the above-mentioned range, an effect of enhancing adhesion performance may not be expected, and when the content is greater than the above-mentioned range on the contrary, the content of the other compositions relatively decreases, and functions as the reactive adhesive composition may not be satisfied. Herein, the content of the polyolefin-based base polymer and the content of the catalyst are limited so that the function of each composition is sufficiently obtained.

The polyolefin-based base polymer forming the reactive polyolefin-based adhesive composition is not particularly limited in the present invention, and polymers commonly used in the art may be used.

As one example, the polyolefin-based base polymer may be polyalphaolefin, polyolefin alone, a copolymer thereof, or a blend thereof. The polyalphaolefin may be obtained by copolymerizing linear alpha-olefin such as 1-butene, 1-pentene, 1-hexene, 1-heptene, 1-octene, 1-decene, 1-undecene, 1-dodecene, 1-tetradecene, 1-hexadecene and 1-eicosene, and the polyolefin may be polyethylene or polypropylene alone, or a copolymer thereof. When necessary, the polyalphaolefin and the polyolefin may be used as they are, or may be silane modified to be used.

The polyolefin-based base polymer may be directly prepared, or commercially-available products may be purchased, and as one example of the silane-modified polyalphaolefin, VESTOPLAST (for example, VESTOPLAST 206V, VESTOPLAST 2412) and the like, products of Evonik Degussa GmbH, may be used. As the silane-modified polyolefin, LICOCENE PE SI 3361 TP, LICOCENE PP and the like, products of Clariant AG, may be used, and as the ethylene alphaolefin, VISTAMAXX 6102 (propylene-based elastomers), EXACT 500 8(ethylene-butene copolymer), EXACT 3031 (ethylene-hexene copolymer) and the like, products of ExxonMobil Chemical Co., may be used, and ENGAGE (for example, ENGAGE 8200) and the like, products of Dow Chemical Co., may be used.

The curing catalyst may be added for adjusting a curing rate. As a specific example, phosphine-based, boron-based, imidazole-based or a mixed catalyst thereof may be used.

As the phosphine-based curing catalyst, triphenylphosphine, tri-o-tolylphosphine, tri-m-tolylphosphine, tri-p-tolylphosphine, tri-2,4-xylylphosphine, tri-2,5-xylylphosphine, tri-3,5-xylylphosphine, tribenzylphosphine, tris(p-methoxyphenyl)phosphine, tris(p-tert-butoxyphenyl)phosphine, diphenylcyclohexylphosphine, tricyclohexylphosphine, tributylphosphine, tri-tert-butylphosphine, tri-n-octylphosphine, diphenylphosphinostyrene, diphenylphosphinous chloride, tri-noctylphosphine oxide, diphenylphosphinyl hydroquinone, tetrabutylphosphonium hydroxide, tetrabutylphosphonium acetate, benzyltriphenylphosphonium hexafluoroantimonate, tetraphenylphosphonium tetraphenylborate, tetraphenylphosphonium tetra-p-tolylborate, benzyltriphenylphosphonium tetraphenylborate, tetraphenylphosphonium tetrafluoroborate, p-tolyltriphenylphosphonium tetra-p-tolylborate, triphenylphosphine triphenylborane, 1,2-bis(diphenylphosphino)ethane, 1,3-bis(diphenylphosphino)propane, 1,4-bis(diphenylphosphino)butane, 1,5-bis(diphenylphosphino)pentane and the like may be used, however, the phosphine-based curing catalyst is not limited thereto. These may be used either alone or as a mixture of two or more types.

As the boron-based curing catalyst, phenylboronic acid, 4-methylphenylboronic acid, 4-methoxyphenylboronic acid, 4-trifluoromethoxyphenylboronic acid, 4-tert-butoxyphenylboronic acid, 3-fluoro-4-methoxyphenylboronic acid, pyridine-triphenylborane, 2-ethyl-4-methylimidazolium tetraphenylborate, 1,8-diazabicyclo[5.4.0]undecene-7-tetraphenylborate and the like may be used, however, the boron-based curing catalyst is not limited thereto. These may be used either alone or as a mixture of two or more types.

In addition, the reactive polyolefin-based adhesive composition according to the present invention may suitably include at least one additive selected from the group consisting of a silane coupling agent, a filler, a flame retardant, a pigment, an antioxidant, an ultraviolet stabilizer, a dispersant, a defoamer, a viscosity agent, a plasticizer, a gluing property-providing resin and combinations thereof.

As one example, epoxy-containing silane or mercapto-containing silane may be used as the silane coupling agent. Examples of the epoxy-containing silane coupling agent may include 2-(3,4-epoxycyclohexyl)-ethyltrimethoxysilane, 3-glycidoxytrimethoxysilane, 3-glycidoxypropyltriethoxysilane and 3-glycidoxypropyltriethoxysilane, examples of the amine group-containing may include N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane and the like, however, the epoxy-containing and the amine group-containing are not limited thereto. These may be used either alone or as a mixture of two or more types.

As the mercapto-containing, 3-mercaptopropylmethyldimethoxysilane, 3-mercaptopropyltriethoxysilane, and iso-cyanate-containing 3-isocyanatepropyltriethoxysilane, and the like, may be included, however, the mercapto-containing and the isocyanate-containing are not limited thereto. These may be used either alone or as a mixture of two or more types.

As the filler, inorganic or organic fillers may be used as necessary.

As the inorganic filler, gold powder, silver powder, copper powder or nickel, a metal component, may be used, and alumina, aluminum hydroxide, magnesium hydroxide, calcium carbonate, magnesium carbonate, calcium silicate, magnesium silicate, calcium oxide, magnesium oxide, aluminum oxide, aluminum nitride, silica, boron nitride, titanium dioxide, glass, iron oxide, ceramic or the like, a non-metal component, may be used, however, the inorganic filler is not limited thereto. These may be used either alone or as a mixture of two or more types.

As the organic filler, carbon, rubber-based fillers, polymer-based and the like may be used, however, the organic filler is not limited thereto. These may be used either alone or as a mixture of two or more types.

A particle size of the filler may be from approximately 10 nm to approximately 10 μm, and preferably from approximately 100 nm to approximately 7 μm. Collision with a semiconductor circuit does not occur in the above-mentioned range, and the circuit is not damaged.

The reactive polyolefin-based adhesive composition including the compositions described above may be prepared by kneading each of the components using, for example, a kneader such as a plastomill, a banbury mixer, a roll or an internal mixer.

The reactive polyolefin-based adhesive composition provided in the present invention may be cured by thermal curing. When performing room temperature or thermal curing, the curing may be performed at approximately from 20° C. to approximately 100° C., and for from 30 seconds to 72 hours depending on the condition.

Particularly, the reactive polyolefin-based adhesive composition may be used in any field requiring an adhesive ability without limiting the materials and the forms. As one example, the reactive polyolefin-based adhesive composition may be used in various materials such as nonferrous metals, rubber, plastics, fibers, woods, leather, ceramics, paper and glass, and may be particularly preferably used when the material is a plastic, especially a polyolefin-based and preferably a polyethylene or polypropylene material.

More preferably, the reactive polyolefin-based adhesive composition of the present invention may be used in automotive interior materials using polyolefin-based materials such as polyethylene or polypropylene.

EXAMPLE

Hereinafter, the present invention will be described in more detail with reference to examples, however, the following examples do not limit the scope of the present invention, and these need to be construed as being provided for illuminating the present invention.

Preparation Example 1: Preparation of Petroleum Resin A

To 1166.70 g of dicyclopentadiene (DCPD, Kolon Industries, Inc., purity 77.14%), 300 g of vinyltrimethoxysilane (TMVS, product of Aldrich, purity 99.99%), and 300 g of maleic anhydride (MAH, product of Aldrich, purity 99.99%), 1233.30 g of Hysol (Kolon Industries, Inc., a process product with a non-polymerizable naphthene-based material as a main component, and used as a solvent) was introduced in an autoclave as a solvent after weighing so that the total amount of the three components became 60% with respect to capacity of the 1 L autoclave, a reactor. After introducing the raw materials, the reactor was tightened, and replaced with nitrogen and slightly pressurized in order to remove unnecessary reactions such as a reaction with oxygen at a high temperature.

The reaction temperature was raised up to 275° C., and when reaching the reaction temperature, the reaction time started to be measured, and the reaction was progressed for 1 hour. Herein, the pressure was adjusted to 10 bar while purging inside the reactor with nitrogen, and the stirring was performed at 300 rpm. When the reaction was completed, the result was cooled after setting the temperature to room temperature. When the cooling is completed to 30° C. or lower, the internal pressure was depressurized, and the reactor was opened to obtain a polymer.

In the polymer, unreacted materials and a solvent were included other than the polymerized material, and therefore, these were removed. Specifically, the total amount of the polymer was introduced to a 1 L glass 4-neck kettle, and vacuumed at room temperature. The degree of vacuum was maintained at 1 bar, and when the vacuum was obtained, the temperature was raised up to 235° C. while stirring. When reaching 235° C., the concentration time started to be measured, and maintained for 10 minutes. When the concentration was completed, the vacuum was released in that state, and the melted resin content inside was recovered.

Preparation Example 2: Preparation of Petroleum Resin B

Petroleum Resin B was prepared in the same manner as in Preparation Example 1 except that the content of each of the monomers was employed as in the following Table 1.

Preparation Example 3: Preparation of Petroleum Resin C

Petroleum Resin C was prepared in the same manner as in Preparation Example 1 except that DCPD, a petroleum resin monomer, was used alone.

Preparation Example 4: Preparation of Petroleum Resin D

Petroleum Resin D was prepared in the same manner as in Preparation Example 1 except that DCPD, a petroleum resin monomer, and TMVS, a silane monomer, were used.

TABLE 1

| | | | Preparation Example 1 | Preparation Example 2 | Preparation Example 3 | Preparation Example 4 |
|---|---|---|---|---|---|---|
| Monomer | Amount of Introduction (g) | C5-DCPD | 1166.70 | 970.53 | 1944.59 | 1556.22 |
| | | TMVS | 300.00 | 300.65 | 0 | 299.65 |
| | | MAH | 300.00 | 450.66 | 0 | 0 |
| | | Solvent | 1233.30 | 1278.15 | 1055.41 | 1144.13 |
| | Monomer Concentration (% by Weight) | | 50.00 | 50.00 | 50.00 | 50.00 |
| | Ratio of Introduction (% by Weight) | C5-DCPD | 60.00 | 50.00 | 100.00 | 80.00 |
| | | TMVS | 20.00 | 20.00 | 0 | 20.00 |
| | | MAH | 20.00 | 30.00 | 0 | 0 |
| | Copolymer | | [DCPD]-[TMVS]-[MAH] | [DCPD]-[TMVS]-[MAH] | [DCPD] | [DCPD]-[TMVS] |

Experimental Example 1: Analysis on Curable Petroleum Resin Properties

Properties of the petroleum resins prepared in Preparation Examples 1 to 4 were measured, and the results are shown in the following Table 2. A method of evaluating properties is as follows.

(1) Yield: the amount of the resin left after the concentration with respect to the weight after polymerization obtained in the polymerization was expressed as a percentage.

(2) Softening point: measured in accordance with the ASTM E 28 standard. The sample was melted and poured into a round ring, and when the resin was hardened, this was mounted on a softening point measuring device, and after placing an iron ball on the hardened resin, the temperature was raised at 0.5° C./min, and the temperature at which the iron ball fell as the resin was melted was measured.

(3) Molecular weight: a polystyrene-converted weight average molecular weight (Mw), a number average molecular weight (Mn) and a Z-average molecular weight (Mz) were measured by gel permeation chromatography (product of Hewlett Packard Enterprise, model name HP-1100). The measured polymer was dissolved in tetrahydrofuran so as to have a concentration of 4000 ppm, and 100 μl thereof was inject to GPC. Tetrahydrofuran was used as a mobile phase of the GPC and introduced at a flow rate of 1.0 mL/minute, and the analysis was performed at 30° C. As for the column, three PIgels (1,000 Å+500 Å+100 Å) of Agilent Technologies, Inc. were series connected. An RI detector (product of Hewlett Packard Enterprise, HP-1047A) was used as a detector, and the measurement was made at 30° C. Herein, the polydispersity index (PDI) was calculated by dividing the measured weight average molecular weight by the number average molecular weight.

TABLE 2

| | Yield (%) | Softening Point (° C.) | Molecular Weight (g/mol) | | | |
|---|---|---|---|---|---|---|
| | | | Mn | Mw | Mz | MWD |
| Preparation Example 1 | 48 | 88 | 352 | 612 | 1042 | 1.74 |
| Preparation Example 2 | 48 | 88 | 357 | 645 | 1241 | 1.81 |
| Preparation Example 3 | 40 | 90 | 368 | 570 | 832 | 1.55 |
| Preparation Example 4 | 50 | 95 | 447 | 774 | 1371 | 1.73 |

Examples 1 to 2, Comparative Examples 1 to 3:
Preparation of Reactive Adhesive Composition A reactive adhesive composition was prepared using each of the petroleum resins prepared in Preparation Examples 1 to 4.

After adding a base polymer, each of the petroleum resins of Preparation Examples 1 to 4 and a catalyst to a mixer, the result was stirred to prepare a reactive adhesive composition. Herein, Si-APAO (Vestoplast 206, Evonik) and Si-PP (Licocene PP SI 1362, Clariant) were used as the base polymer, and Hordaphos (Clariant), a phosphorous-based catalyst, was used as the catalyst.

TABLE 3

| | Base Polymer (g) | | Petroleum Resin (g) | | | | Catalyst (g) |
|---|---|---|---|---|---|---|---|
| | Si-APAO | Si-PP | Preparation Example 1 | Preparation Example 2 | Preparation Example 3 | Preparation Example 4 | |
| Example 1 | 50 | 30 | 20 | — | — | — | 0.5 |
| Example 2 | 50 | 30 | — | 20 | — | — | 0.5 |
| Comparative Example 1 | 50 | 30 | — | — | — | — | 0.4 |
| Comparative Example 2 | 50 | 30 | — | — | 20 | — | 0.5 |
| Comparative Example 3 | 50 | 30 | — | — | — | 20 | 0.5 |

Experimental Example 2: Evaluation on Reactive Adhesive Composition Properties

After coating each of the reactive adhesive compositions prepared in the examples and the comparative examples on a substrate, properties provided below were measured, and the results are shown in the following Table 4.

(1) Single-Lap Shear Adhesion Strength (LSS), Kgf

In order to evaluate single-lap shear adhesion strength, the quantified reactive adhesive composition was coated (coated area: 1 inch×1 inch) between two cut polypropylene specimens (1 inch×6 inches), and the result was cured.

The curing was performed for 2 weeks at room temperature (25° C.) and under humidity (60% to 70%), and maximum stress (strength) was measured using an Instron tester. A total of 5 tests were performed and an average value was taken.

(2) Shear Adhesion Failure Test (SAFT), ° C.

A shear adhesion failure tester (SAFT) was used for the measurements. This test measures an ability to withstand depending on time and temperature under sheer stress, and after coating an adhesive to a size of 1 inch×1 inch between polypropylene specimens (3 inches×2 inches), a polypropylene specimen (3 inches×1 inch) was attached thereto. After curing the result, a 1 kg weight was applied to the substrate (3 inches×1 inch) on one side, and a critical temperature of enduring was measured while slowly raising the temperature at a rate of 0.4° C. per minute starting from 40° C. Herein, a higher holding temperature means excellent heat resistance.

(3) Holding Power Test, Min

This holding power test is a test that tests holding power of the adhesive composition, and after coating an adhesive between substrates, the result was cured (specific method of specimen preparation is the same as the SAFT), and after applying a 1 kg weight to the substrate on one side, a critical time of enduring at 80° C. was measured. Herein, a higher holding power (longer time) means excellent cohesive strength.

Herein, all the numbers in the following Table 4 were relative numbers when employing the number before curing of Comparative Example 1 that did not use a petroleum resin as 100%.

TABLE 4

|  | LSS (%, Relative Number) | | SAFT (%, Relative Number) | | Holding Power (%, Relative Number) | |
| --- | --- | --- | --- | --- | --- | --- |
|  | Before Curing | After Curing | Before Curing | After Curing | Before Curing | After Curing |
| Example 1 | 105 | 200 | 103 | 133 | 102 | >3000 |
| Comparative Example 1 | 100 | 155 | 100 | 108 | 100 | 313 |
| Comparative Example 2 | 94 | 97 | 94 | 95 | 66.1 | 215 |
| Comparative Example 3 | 99 | 175 | 98 | 120 | 77 | >3000 |

When referring to Table 4, the LSS, the SAFT and the holding power maximally increased after curing by approximately 106%, approximately 40% and approximately 1295%, respectively, compared to Comparative Examples 1 to 3 when using cyclic anhydride as a comonomer according to the present invention.

When using a petroleum resin but varying the composition as in Comparative Examples 2 and 3, it was identified that adhesive strength and holding power were slightly enhanced, but at an insignificant level compared to Example 1.

In addition, it was seen that Comparative Example 3 including the petroleum resin according to Preparation Example 4 including a petroleum resin monomer and a silane monomer had similar holding power compared to Example 1, however, the LSS and the SAFT were significantly superior in Example 1 according to the present invention.

INDUSTRIAL APPLICABILITY

The curable petroleum resin according to the present invention may be preferably used as a composition added to a reactive adhesive composition.

The invention claimed is:

1. A curable petroleum resin comprising:
   a repeating unit (A) derived from a petroleum resin monomer;
   a repeating unit (B) derived from a silane monomer; and
   a repeating unit (C) derived from a cyclic anhydride monomer,
   wherein, based on the total weight of the repeating unit,
   the wt % of the repeating unit (A) derived from a petroleum resin monomer is 30% to 70%;
   the wt % of the repeating unit (B) derived from a silane monomer is 10% to 40%; and
   the wt % of the repeating unit (C) derived from a cyclic anhydride monomer is 10% to 30%,
   wherein the petroleum resin monomer comprises one selected from the group consisting of
   mixed C5 fractions and dicyclopentadiene,
   mixed C9 fractions and dicyclopentadiene, and
   mixed C5 fractions, mixed C9 fractions, and dicyclopentadiene,
   wherein the silane monomer is represented by the following Chemical Formula 2:

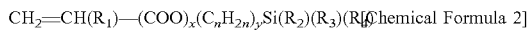

[Chemical Formula 2]

wherein $R_1$ is hydrogen or a methyl group;
   $R_2$ to $R_4$ are the same as or different from each other, and hydrogen, or a C1 to C12 alkoxy group;
   n is an integer of 1 to 12 and
   x and y are 0 or 1.

2. The curable petroleum resin of claim 1, wherein the cyclic anhydride monomer comprises one selected from the group consisting of maleic anhydride, itaconic anhydride, citraconic anhydride, propenyl succinic anhydride, 2-pentenedioic anhydride and combinations thereof.

3. The curable petroleum resin of claim 1, wherein $R_2$ to $R_4$ are a C1 to C6 alkoxy group, n is an integer of 1 to 6.

4. The curable petroleum resin of claim 1, wherein the silane monomer comprises one selected from the group consisting of vinyltrimethylsilane, vinyltrimethoxysilane, vinyltriethoxysilane, triacetoxyvinylsilane, triphenylvinylsilane, tris(2 methoxyethoxy)vinylsilane, 3-(trimethoxysilyl) propyl methacrylate, γ (meth)acryloxypropyltrimethoxysilane and mixtures thereof.

5. The curable petroleum resin of claim 1, wherein the curable petroleum resin has a softening point of from 70° C. to 150° C., and a weight average molecular weight (Mw) of from 500 g/mol to 5000 g/mol.

6. A reactive adhesive composition comprising:
   a polyolefin-based base polymer;
   a petroleum resin; and
   a catalyst,
   wherein the petroleum resin is the curable petroleum resin of claim 5.

7. The reactive adhesive composition of claim 6, comprising based on the total weight of the composition:
   the polyolefin-based base polymer in 70% by weight to 94% by weight;
   the petroleum resin in 5% by weight to 30% by weight; and
   the catalyst in 0.1% by weight to 10% by weight.

8. The reactive adhesive composition of claim 6, wherein the polyolefin-based base polymer comprises one selected from among polyalphaolefin, polyolefin alone, copolymers thereof or blends thereof.

* * * * *